CONTROL OF AMPLIFIER SOURCE RESISTANCE

Filed Aug. 29, 1956 2 Sheets-Sheet 1

Inventor
Charles A. Wilkins
By L. F. Hammond
Attorney

CONTROL OF AMPLIFIER SOURCE RESISTANCE

Filed Aug. 29, 1956 2 Sheets-Sheet 2

INVENTOR.
Charles A. Wilkins
BY
L. F. Hammond
Atty.

2,905,761

CONTROL OF AMPLIFIER SOURCE RESISTANCE

Charles A. Wilkins, New York, N.Y., assignor to The Siegler Corporation, Paramus, N.J., a corporation of Delaware Application August 29, 1956, Serial No. 606,874

10 Claims. (Cl. 179—1)

This invention relates to electrical circuitry for controlling and varying the apparent source resistance of an amplifier, and particularly for adjusting the apparent source resistance of an amplifier through a wide range of negative values as well as positive values, to effect a variable damping factor control on the circuit.

It is heretofore pointed out that by changing the apparent source resistance of a power amplifier it is practical to control the damping factor of the circuit, since this damping factor expresses the relationship between the load resistance of the circuit and its source resistance as follows:

$$DF=\frac{Z_1}{Z_s} \text{ or } Z_s=\frac{Z_1}{DF}$$

where $Z_s$ is the amplifier source impedance, $Z_1$ is the load impedance, and DF is the amplifier damping factor.

In the prior disclosure of United States patent application Serial No. 430,816, now Patent No. 2,843,671, there are shown several variations of circuitry to accomplish this general objective, and other circuits heretofore known in the art have also proposed to accomplish the broad objective of altering the damping factor of an amplifier by causing changes in its apparent source resistance; but it is believed that the present disclosure includes features not heretofore known, yet which provide important new conveniences and improved results in the control.

It is one of the important objects of the present invention to provide an amplifier wherein the damping factor may be adjusted throughout the wide range required in the highest grades of equipment by manipulation of only a single control element. In the present invention it is possible to vary the apparent source resistance of the amplifier smoothly, continuously and uninterruptedly from a high positive value down to zero, and even into a relatively high apparent negative resistance, merely by shifting of a single potentiometer control. By this arrangement a continuous, smooth, infinitely variable control of the damping factor is accomplished, notwithstanding that all variable damping controls in use at present operate on the principle of introducing a feedback voltage that is proportional to the current passing through the amplifier load and mixing this voltage in controlled proportions with the overall negative voltage-proportional feedback voltage. It follows that electrical accomplishment of the desired results requires precise and balanced regulation of negative voltage-proportional feedback, negative current-proportional feedback and positive current-proportional feedback.

A further related object is to accomplish this smooth, continuous, single control regulation without unnecessarily large dissipation of output power of the amplifier, notwithstanding that its adjustment may extend over a considerably greater range of values than heretofore contemplated. In this connection the present disclosure contemplates continuous variation of the damping factor from a value of +0.1 through infinity and into a negative value of −1.5. This range of variation, when applied to an output load of 16 ohms for example, will represent a variation in apparent source impedance ranging from +160 ohms to −10.7 ohms. These results are accomplished in the present teaching with circuitry requiring no more than 20% of the output power.

A further important objective of the present invention is the provision of a damping factor and source impedance control so designed as to have no effect on the distortion level of the amplifier circuit. It follows that fidelity of response of the amplifier is entirely independent of the damping control adjustment. This is accomplished in the present invention by simultaneous control of negative voltage-proportional feedback and current-proportional feedback which may be either negative or positive, accomplished through a purely resistive network so that both feedback potentials are in perfect predetermined phase relation to accomplish their intended purpose.

A still further object of the invention is the provision of a variable damping factor control circuit wherein adjustments of the damping factor may be made throughout the full range of adjustment thereof without effect on the potential of the feedback voltage or output voltage level and consequently without effect on the gain of the amplifier. This is accomplished in the present teaching by a selection of parameters of the feedback network according to a specific relationship set forth herein, whereby the feedback regulating potentiometer is placed between points of equal voltage in the circuit.

Further objects of the invention are to accomplish the aims and objects indicated above with comparatively simple electrical circuitry, requiring no filters nor transformers in addition to those conventionally employed, and of such design and construction that it is both economical from the standpoint of manufacture and dependable in use.

The manner in which the circuitry disclosed herein accomplishes the foregoing aims will be most easily understood by reference to the drawings of this specification, wherein.

It should be understood that while the principles of this invention may be applicable to amplifier circuits using various types of load devices, yet the invention finds its greatest present field of usefulness in connection with high fidelity sound equipment, in which the damping properties of the amplifier circuit may be varied to accomplish various wanted results, particularly by providing any degree of damping best suited to the electrical and mechanical characteristics of the loud speaker and speaker enclosures, as well as with respect to the acoustic properties of the room in which the apparatus is intended to function.

Figure 1:
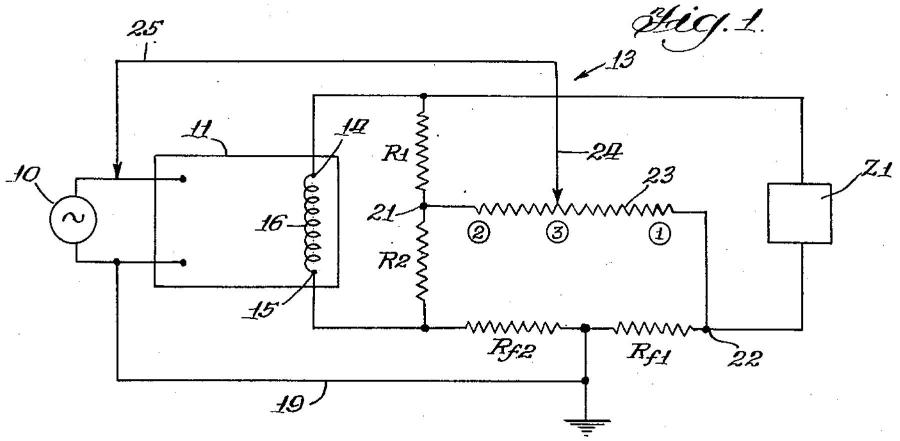
Figure 1 is a block circuit diagram showing a signal source, an amplifier and a load, together with a damping factor control circuit designed and constructed in accordance with the present teachings.
Figure 2:
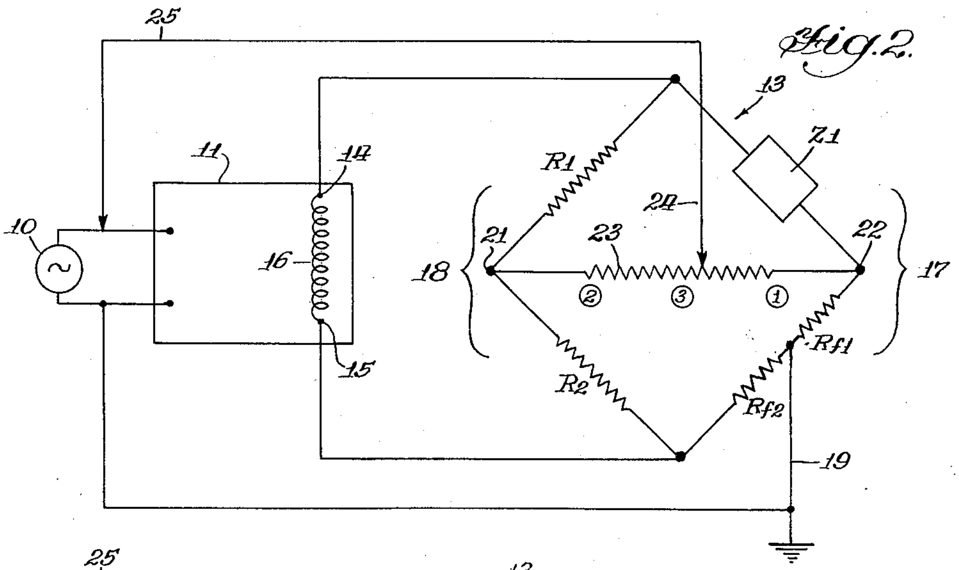
Figure 2 is the circuit diagram of Figure 1, with alteration to which reference is made in connection with analysis of the circuit.

In Figure 1 it will be apparent that signals originating at source 10 will be fed to amplifier 11 and the amplifier output will be delivered to the speaker or other load $Z_1$ through a five element damping control network generally designated as 13. The circuit 13 is essentially a resistive bridge circuit which includes two branches extending in parallel across the output terminals 14 and 15 of the secondary winding 16 of the output transformer of the amplifier 11. These branches, as perhaps best diagrammed in Figure 2, include a load branch 17 (shown on the right hand side of Figure 2) and a control branch 18 (on the left). The load branch extends through the speaker voice coil (represented as load $Z_1$) and thence through a feedback resistor $R_{f1}$ to feedback return connection 19 and to ground. The control branch 18 extends from the amplifier terminal 14 comprising a resistor $R_1$ and a resistor $R_2$ to terminal 15, and thence through feedback resistor $R_{f2}$ to ground.

According to the preferred practice of the present invention the parameters of the resistors $R_1$, $R_2$, $R_{f1}$ and $R_{f2}$ are so chosen with respect to the load $Z_1$ as to provide equal potentials at the junction points 21 and 22 as will appear. The opposite ends of a potentiometer resistor 23 are connected between these junction points, and the slider 24 of the potentiometer is coupled to a feedback lead 25 which is returned to the input circuit of the amplifier in the conventional manner. A typical selection of values for the circuit may be as follows:

| | Ohms |
|---|---|
| Load $Z_1$ | 12 |
| Resistor $R_1$ | 150 |
| Resistor $R_2$ | 17 |
| Resistor $R_{f1}$ | 0.47 |
| Resistor $R_{f2}$ | 0.89 |

With the circuit disclosed it will be apparent that the resistors $R_1$ and $R_2$ function as a voltage divider to develop a voltage at the junction 21 which is at all times proportionate to the output voltage existing in the circuit and which may be applied to the amplifier as negative voltage-proportional feedback. Also, the resistors $R_{f1}$, $R_{f2}$, $R_2$ and the potentiometer resistor 23 form a bridge circuit through which the current from the load $Z_1$ will flow. This provides a source of current-proportional feedback which may be either negative or positive. By the present invention, all of these feedback potentials are simultaneously varied by a single adjustment, to give continuous and uninterrupted control of the damping factor of the circuit. Adjustment is accomplished by the slider 24 of the potentiometer, which will sample a potential proportionate to the current flowing through the load at all times. This potential will vary from a maximum negative current-proportional feedback value at the point 1 through a zero value (at some intermediate point such as 3) and thence to a maximum positive current-proportional feedback value at point 2 on the potentiometer.

In addition, when the slider 24 is in position 2 the full negative voltage-proportional potential existing at junction 21 will be impressed upon the feedback lead 24. The position of the slider 24 will be effective to vary this potential, however, decreasing it gradually to zero at point 1, where there will be no voltage-proportional potential returned to the amplifier.

In practical operation of the circuit the characteristics of the source resistance and consequently the damping factor may be smoothly and continuously varied throughout the entire range of adjustment of the equipment merely by manipulation of the single potentiometer slider 24. When this slider is positioned at point 1 a negative current-proportional feedback of maximum potential is applied to the amplifier. With this setting no voltage-proportional feedback is applied. It follows that the amplifier circuit will possess a high positive source resistance so that it tends to act as a constant current source. It will display a frequency characteristic that follows the impedance characteristic of the speaker and will tend to exaggerate mechanical or acoustic resonances in the speaker or its enclosure. It also decreases transient response. In short, a setting of the potentiometer at point 1 results in an underdamped condition.

As the potentiometer slider is moved to the left along the resistance 23 the negative current-proportional voltage is gradually reduced to zero and then gradually increased to a positive value. Simultaneously, negative voltage-proportional feedback is applied, and this potential is increased to a maximum at point 2. It follows that at point 2 there is a maximum positive current-proportional feedback combined with maximum negative voltage-proportional feedback. Thus with this setting the amplifier has a maximum negative value of source resistance. The negative resistance tends to cancel the D.C. resistance of the load and approaches a condition of ultimate damping. The result is that the circuit will now tend to function as a constant voltage source, and tend to suppress the effects of speaker resonances so that the output is relatively free of resonances with improved transient response and with the effects of the inherently non-linear compliance of the speaker spider and other parts reduced. The overall result is improved linearity, and reduction of distortion in the speaker output. It is recognized that this setting may also decrease the low frequency sound output of the circuit but if this is regarded as undesirable it can be corrected by a preamplifier tone control.

According to the preferred teachings of the present invention the damping factor control potentiometer should have the opposite ends of its resistive element connected between points of equal voltage so that the entire range of damping adjustment (that is, the full range of adjustment of the apparent source resistance of the amplifier) may be accomplished without change of gain of the circuit. This can be accomplished by arranging the parameters of the circuit so that the ratio of the nominal impedance of the speaker $Z_2$ to the combined value of the current-proportional feedback resistors $R_{f1}$ and $R_{f2}$ is substantially equal to the ratio between the values of the voltage divider resistors $R_1$ and $R_2$. In other words the bridge circuit, as seen from the leads of the output transformer secondary, should be inherently balanced and conformed to the formula $$\frac{R_1}{R_2}=\frac{Z_1}{R_{f1}+R_{f2}}$$

or $$R_2=\frac{R_1(R_{f1}+R_{f2})}{Z_1}$$

Substituting the values heretofore set forth, in ohms, (the 12 ohm figure representing the impedance of the speaker being, of course, its nominal impedance, usually rated at 400 cycles) the latter formula becomes $$17=\frac{150\times 1.36}{12}$$

or $$17=17$$

A mathematical analysis of the circuit showing that the closed circuit gain remains constant throughout the entire range of variation of the source impedance values appears in the "Journal of the Audio Engineering Society," for January 1956, volume 4, Number 1.

Figure 3:
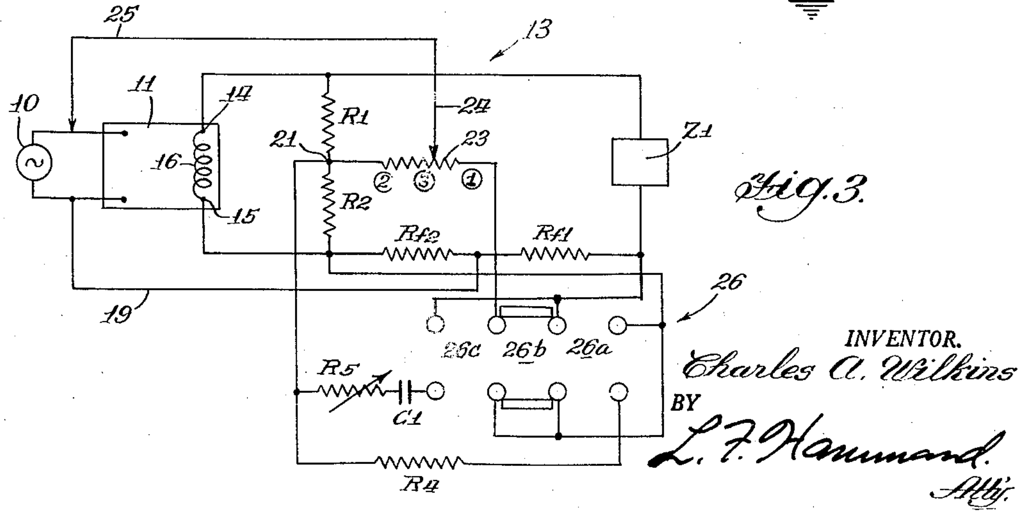
Figure 3 is a slightly modified circuit diagram similar to the figures described above showing a switching arrangement whereby the damping factor control and other auxiliary controls may be conveniently arranged for optional operation in the circuit.

It will be desirable in some cases to cause the amplifier to exhibit a negative inductance as well as a negative resistance in the appropriate range of the control. The control system described previously and shown in Figures 1 and 2 may be modified quite easily so that only a positive source resistance is exhibited by the amplifier throughout the positive source resistance range of control variation while a negative source inductance is exhibited throughout the negative source resistance range of the control variation. Figure 3 shows one possible practical utilization of the system incorporating a capacitor $C_1$ and a variable resistor $R_5$ in the circuit. A three position switch 26 has also been incorporated into the circuit. Position **26*a* of the switch eliminates all current feedback and restores the amplifier to normal negative voltage feedback operation with resistor $R_4$ adjusting the amount of feedback in this position to maintain the gain reduction factor constant. Position 26*b* permits control slider 24 to adjust the source resistance only. Position 26*c* permits the control slider 24** to adjust the source resistance while variable resistance control $R_5$ permits adjustment of the negative source inductance.

Figure 4:
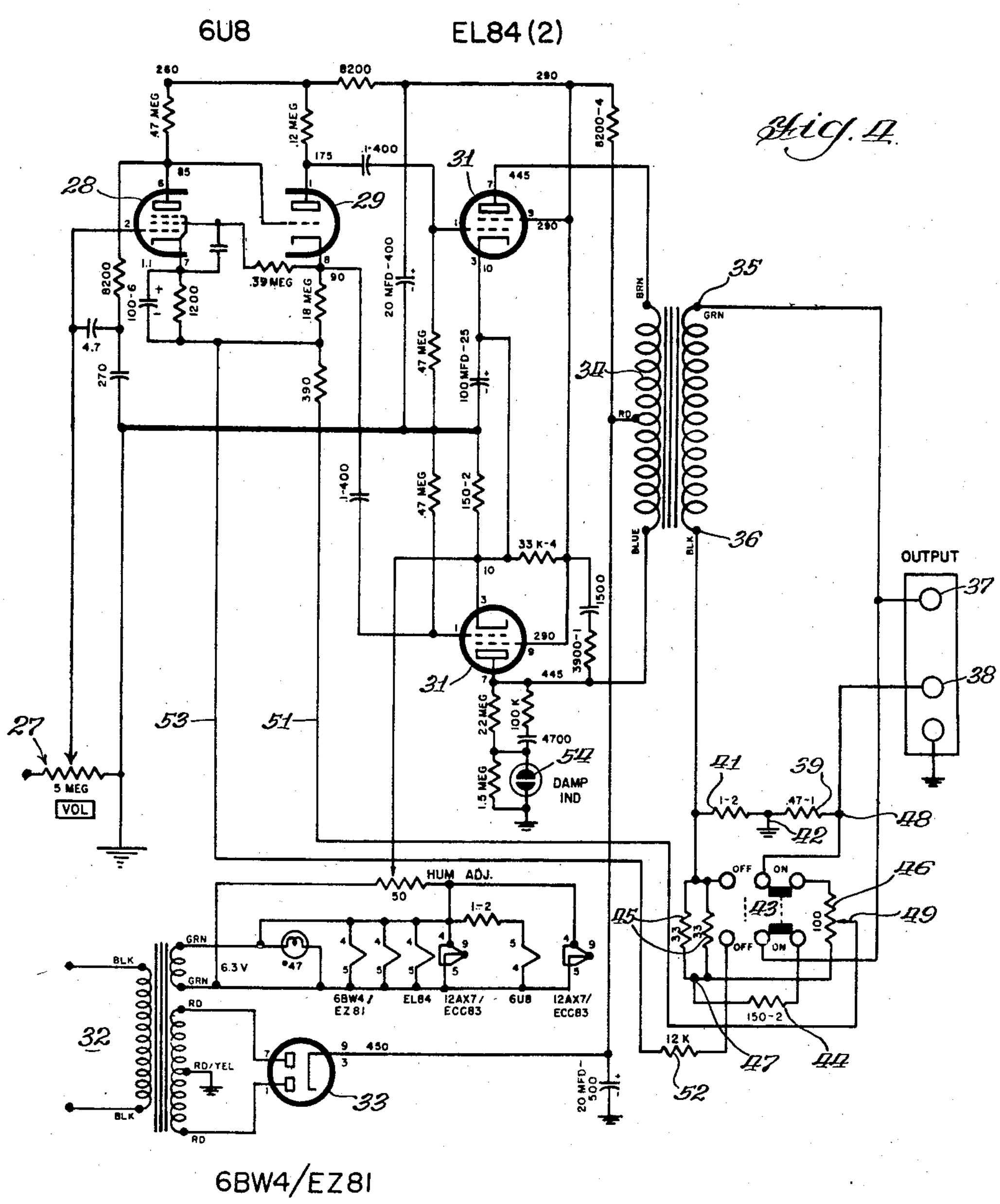
Figure 4 is a partial wiring diagram of a high fidelity audio frequency power amplifier representing a typical commercial embodiment of the invention.

In practical application, the principles of the present invention may be applied to circuits such as the high fidelity amplifier circuit partially shown in Figure 4 wherein a signal emanating from a preamplifier and filter stages (not shown) is introduced into the power amplification section of the circuit through a volume control potentiometer 27. A signal of the desired volume is thus imposed on the control grid of driver tube 28 interconnected with a phase inverter tube 29 feeding a pair of output power tubes 31. The circuitry shown may be conventional, and as shown includes a power supply section having a transformer 32 and rectifier 33 to provide plate current potential to the anodes of the output tubes. The power tubes 31 are preferably connected to the primary winding of the output transformer 34 in push-pull relation as is conventional.

In this circuit, as in the simplified circuits heretofore described, the variation of the damping factor is accomplished by proper adjustment of a resistive network extending between the terminals 35 and 36 of the output transformer secondary winding. The terminals 35 and 36 of the output transformer extend through current-proportional feedback resistors 39 and 41 to a pair of speaker terminals 37 and 38, to which the speaker may be connected. This places the speaker in circuit in series with the current-proportional feedback resistors 39 and 41 corresponding to the resistors $R_{f1}$ and $R_{f2}$ heretofore described. The junction point between resistors 39 and 41 is grounded, as heretofore, and this connection 42 also acts as the return connection for the variable feedback.

The voltage-proportional feedback branch of the circuit extends from the transformer terminal 35 through a two position switch 43 and thence through a resistor 44 corresponding to the resistance $R_1$ and a pair of parallel resistors 45 corresponding to resistance $R_2$. A potentiometer 46 is bridged between the junction points 47 and 48, corresponding to the junction points 21 and 22 respectively. The switch 43 is also included in the potentiometer circuit.

As thus far described, it will be apparent that the circuit of Figure 4 is essentially the same as those heretofore described so that full range of adjustment of the damping factor control of the circuit may be accomplished by moving the potentiometer slider 49 back and forth along the resistor 46. The feedback potential is returned to the circuit of the driver tube 28 through the feedback lead 51. The switch 43 is provided, however, so that, if desired, it may be moved to the "off" position indicated, rendering the entire damping factor network inoperative in the circuit. When this is done, the switch also short circuits the feedback resistors 39 and 41 and opens the connection from feedback resistor 44 to terminal 35 of the output transformers to conserve the output power of the circuit. In its "off" position, the switch 43 interconnects the feedback resistor 52 and feedback lead 53 to the terminal 35 of the output transformer, to provide the required negative voltage-proportional feedback to the driver tube 28.

If desired, the circuit may include a damping indicator in the form of a visual signal. Preferably this comprises a neon glow lamp 54 joined to the plate circuit of one of the output tubes 31 by appropriate resistances. When the slider 49 of the potentiometer is moved to such a point that the circuit oscillates it causes the indicator 54 to flash. Thus by backing off the slider 49 until the bulb 54 stops flashing, the lamp provides a visual indication which facilitates adjustment of the potentiometer 49 to a condition of practical cancellation of the resistance of the load circuit.

From the foregoing it will be apparent that the present circuit provides an extremely broad range of control of the damping factor of an amplifier circuit, with but a single potentiometer arranged to apply negative voltage-proportional feedback, negative current-proportional feedback, and positive current-proportional feedback in controlled proportions as required. When the potentiometer slider 24 is positioned at the right hand end of the resistor (designated as point 1) it imposes 100% pure negative current-proportional feedback on the lead 25. At this time the voltage-proportional feedback is zero. It follows that with this setting, the load circuit will be underdamped. It will thus display an exaggerated bass response because of the mechanical and acoustic resonance of the speaker and its relating instrumentalities.

As the potentiometer slider is moved toward point 2 illustrated in the drawings, a negative voltage-proportional feedback is introduced and gradually increased while the negative current-proportional feedback potential imposed on the feedback lead is gradually reduced. The current-proportional feedback continues to reduce until a zero value is reached at some intermediate point on the slider, after which it increases as positive current-proportional feedback. Both the positive current-proportional and negative voltage-proportional feedbacks reach a maximum value at point 2 on the resistor. Thus when the slider is at point 2 the maximum negative source resistance is generated. A condition of oscillation is reached when the negative source resistance exactly equals the D.C. resistance of the load. Ultimate damping, being the highest practical degree of electrical damping obtainable without incurring a condition of oscillation, is achieved when slightly less than 100 percent of the D.C. resistance of the load is cancelled by the negative source resistance. In a practical amplifier it follows that adjustment of the circuit in this direction will suppress the effect of speaker resonances, improve the transient response of the speaker and reduce its distortion. It follows that by careful adjustment the slider of the potentiometer may be brought to a point resulting in the optimum degree of damping required to get best results.

Having thus described my invention, what I claim as new and desire to protect by United States Letters Patent is:

1. In an amplifier circuit including a signal source, an output transformer, and a feedback lead, the combination of a variable damping factor control circuit comprising a bridge circuit with two branches, one of said branches being a load branch and the other comprising a feedback branch, with each branch extending across the secondary winding of said output transformer; said load branch consisting of the voice coil of a speaker in series with a pair of current-proportional feedback resistors; the combined resistive values of said resistors being substantially less than the nominal impedance of said speaker with a junction point between the voice coil and the adjacent feedback resistor being a point of intermediate proportional potential with respect to the output transformer potential; the aforementioned feedback branch of the bridge circuit consisting of a voltage divider comprising a pair of resistors in series with each other across the output transformer and interconnected at a junction being of a point of intermediate proportional potential with respect to the secondary potential of the transformer, with the resistive value of one of said resistors substantially less than the other; a potentiometer interconnected between said junctions, with the slider of the potentiometer joined to the feedback lead to permit continuous uninterrupted variation of the negative voltage-proportional feedback from zero to a maximum value simultaneously with a variation of current-proportional feedback from a relatively high negative value through a zero point and to a positive value.

2. In an amplifier circuit including a signal source, an output transformer, and a feedback lead, the combination of a variable damping factor control circuit comprising a bridge circuit with two branches, one of said branches being a load branch and the other comprising a feedback branch, with each branch extending across the secondary winding of said output transformer; said load branch consisting of the voice coil of a speaker in series with a pair of current-proportional feedback resistors; with a junction point between the voice coil and the adjacent feedback resistor being a point of intermediate proportional potential with respect to the output transformer potential; the aforementioned feedback branch of the bridge circuit consisting of a voltage divider comprising a pair of resistors in series with each other across the output transformer and interconected at a junction being of a point of intermediate proportional potential with respect to the secondary potential of the transformer, a potentiometer interconnected between said junctions, with the slider of the potentiometer joined to the feedback lead to permit continuous uninterrupted variation of the negative voltage-proportional feedback from zero to a maximum value simultaneously with a variation of current-proportional feedback from a relatively high negative value through a zero point and to a positive value.

3. In an amplifier circuit including a signal source, an output transformer, and a feedback lead, the combination of a variable damping factor control circuit comprising a bridge circuit with two branches, one of said branches being a load branch and the other comprising a feedback branch, with each branch extending across the secondary winding of said output transformer; said load branch comprising the voice coil of a speaker in series with a pair of current-proportional feedback resistors; the aforementioned feedback branch of the bridge circuit consisting of a voltage divider comprising a pair of resistors in series with each other across the output transformer secondary together with a variable impedance device interconnected between said two branches and joined to the feedback lead to permit continuous uninterrupted variation of the negative voltage-proportional feedback from zero to a maximum value simultaneously with a variation of current-proportional feedback from a relatively high negative value through a zero point and to a positive value.

4. In an amplifier circuit including a signal source, output terminals, and a feedback lead, the combination of a variable damping factor control circuit comprising a bridge circuit with two branches, one of said branches being a load branch and the other comprising a feedback branch, with each branch extending across the said output terminals; said load branch comprising a load device in series with a pair of current-proportional feedback resistors; the combined resistive values of said resistors being substantially less than the impedance of said load, with a junction point between the voice coil and the adjacent feedback resistor being a point of intermediate proportional potential with respect to the potential between the output terminals; the aforementioned feedback branch of the bridge circuit consisting of a voltage divider comprising a pair of resistors in series with each other across the output terminals and interconnected at a junction being of a point of intermediate proportional potential with respect to the output terminals, with the resistive value of one of said resistors substantially less than the other; a potentioimeter interconnected between said junctions, with the slider of the potentiometer joined to the feedback lead to permit continuous uninterrupted variation of the negative voltage-proportional feedback from zero to a maximum value simultaneously with a variation of current-proportional feedback from a relatively high negative value through a zero point and to a positive value.

5. The combination of claim 4 wherein the ratio of the impedance of the load to the combined values of the current-proportional feedback resistors is substantially equal to the ratio between the value of the voltage divider resistors.

6. In an audio frequency amplifier circuit including a signal source, an output transformer, and a feedback circuit having a feedback lead and a return connection, the combination of a damping factor control network consisting of a bridge circuit with two branches, one of said branches consisting of a speaker and a pair of current-proportional feedback resistors in series across the secondary winding of the output transformer; the other branch comprising a voltage divider having a pair of resistors in series across the aforementioned secondary winding; a potentiometer extending from a junction between the speaker and feedback resistor to a junction between the paired resistors of said voltage divider; with an adjustable contact on said potentiometer extending to the feedback lead of the amplifier, and with the return connection of the feedback circuit joined to a junction between the aforementioned current-proportional feedback resistors.

7. The combination of claim 6 wherein the ratio of the nominal impedance of the speaker to the combined values of the current-proportional feedback resistors is substantially equal to the ratio between the values of the voltage-divider resistors.

8. In an audio frequency amplifier circuit including a signal source, an output transformer, and a feedback circuit having a feedback lead and a return connection, the combination of a damping factor control network consisting of a bridge circuit with two branches, one of said branches consisting of a speaker and a pair of current-proportional feedback resistors in series across the secondary winding of the output transformer; the other branch comprising a voltage divider having a pair of resistors in series across the aforementioned secondary winding; with a variable impedance interconnected to points of equal voltage in each of said branches and extending to the feedback lead of the amplifier, and with the return connection of the amplifier joined to a junction between the aforementioned current-proportional feedback resistors.

9. In an amplifier circuit including a signal source output terminals and a feedback circuit having a feedback lead and a return connection, the combination of a damping factor control network consisting of a bridge circuit with two branches, one of said branches consisting of a load and a pair of current-proportional feedback resistors in series across said output terminals; the other branch comprising a voltage divider having a pair of resistors in series across the aforementioned terminals; with a variable impedance interconnected to each of said branches and extending to the feedback lead of the amplifier, and with the return connection of the feedback circuit joined to a junction between the aforementioned current-proportional feedback resistors.

10. In an audio frequency amplifier circuit including a signal source, an output transformer, and a feedback circuit having a feedback lead and a return connection, the combination of a damping factor control network consisting of a bridge circuit with two branches, one of said branches consisting of a speaker and a pair of current-proportional feedback resistors in series across the secondary winding of the output transformer; the other branch comprising a voltage divider having a pair of resistors in series across the aforementioned secondary winding; a potentiometer extending from a junction between the speaker and feedback resistor to a junction between the paired resistors of said voltage divider; with an adjustable contact on said potentiometer extending to the feedback lead of the amplifier.

References Cited in the file of this patent

UNITED STATES PATENTS

| | | |
|---|---|---|
| 2,282,380 | Root | May 12, 1942 |
| 2,843,671 | Wilkins et al. | July 15, 1958 |

OTHER REFERENCES

"Variable Damping Factor Control," by Wilkins, Audio Engineering, September 1954, pp. 31–33.

"Reducing Loudspeaker Distortion," by Wilkins, Radio and Television News, April 1955, pp. 48–50.